(12) United States Patent
Lin

(10) Patent No.: US 9,239,227 B1
(45) Date of Patent: Jan. 19, 2016

(54) 3D LASER MEASURING DEVICE

(71) Applicant: Zhong Jian Lin, Ozone Park, NY (US)

(72) Inventor: Zhong Jian Lin, Ozone Park, NY (US)

( * ) Notice: Subject to any disclaimer, the term of this patent is extended or adjusted under 35 U.S.C. 154(b) by 0 days.

(21) Appl. No.: 14/565,650

(22) Filed: Dec. 10, 2014

Related U.S. Application Data

(60) Provisional application No. 62/054,954, filed on Sep. 24, 2014.

(51) Int. Cl.
*G01B 11/00* (2006.01)
*G01C 15/00* (2006.01)
*G02B 5/12* (2006.01)
*G01B 9/00* (2006.01)

(52) U.S. Cl.
CPC ............... *G01B 11/002* (2013.01); *G01B 9/00* (2013.01); *G01C 15/002* (2013.01); *G02B 5/12* (2013.01)

(58) Field of Classification Search
CPC .............................. G01B 11/00; G01B 11/005
USPC .................... 356/237.1–241.6, 242.1–243.8, 356/426–431, 600–640
See application file for complete search history.

(56) References Cited

U.S. PATENT DOCUMENTS

| | | | | |
|---|---|---|---|---|
| 3,897,637 A * | 8/1975 | Genho | ................. | G01C 15/004 33/227 |
| 5,067,013 A * | 11/1991 | Lindholm | ............... | B66C 13/46 294/66.2 |
| 5,387,969 A * | 2/1995 | Marantette | ............. | G05B 19/21 356/3.09 |
| 5,505,000 A * | 4/1996 | Cooke | .................. | G01B 5/0002 33/286 |
| 5,589,981 A * | 12/1996 | Kasser | ................... | G02B 5/122 244/167 |
| 5,841,535 A * | 11/1998 | Aoki | ....................... | G01S 17/08 356/493 |
| 6,154,319 A * | 11/2000 | Rando | .................. | G01C 15/002 359/618 |
| 6,438,854 B1 * | 8/2002 | Kott, Jr. | .................. | B25B 5/068 269/6 |
| 8,266,807 B2 * | 9/2012 | Olsen | ..................... | G01C 15/12 33/286 |
| 8,902,408 B2 * | 12/2014 | Bridges | ................ | G01C 15/002 342/118 |
| 2006/0283029 A1 * | 12/2006 | Jan | ....................... | G01C 15/002 33/286 |
| 2007/0153297 A1 * | 7/2007 | Lau | ......................... | G01C 11/00 356/620 |

* cited by examiner

*Primary Examiner* — Kara E Geisel
*Assistant Examiner* — Jerreas C Underwood
(74) *Attorney, Agent, or Firm* — Troutman Sanders LLP

(57) ABSTRACT

The invention discloses a portable and movable 3D laser measuring device, comprising: a measurement body; an X-axial laser beam outlet and an X-axial reception lens arranged on a side wall of the measurement body, and a Y-axial laser beam outlet and a Y-axial reception lens arranged on another side wall; a Z-axial laser beam outlet and a Z-axial reception lens arranged on the bottom of the measurement body, and a groove formed in the bottom and being open at the side wall with the X-axial laser beam outlet and at the side wall with the Y-axial laser beam outlet; a control device placed inside the measurement body and configured to control the emitting of the laser beams from the laser beam outlets when receiving a measurement instruction through a measurement button on the measurement body. By using the 3D laser measuring device, the three dimensions of a shipping box can be easily measured.

10 Claims, 5 Drawing Sheets

3D LASER MEASURING DEVICE

FIELD OF THE INVENTION

The present invention relates to the field of measurement technology, more particularly, to a portable and movable 3D laser measuring device.

BACKGROUND OF THE INVENTION

In the course of cargo transportation, it is generally required to use a shipping box for shipping the cargo. When using transportation tools to ship a large quantity of goods, it is critical for the carriage to obtain the volume and weight of shipping boxes in advance. The existing measuring devices are generally large-scale devices, and it is required to place a shipping box onto the bearing platform of the measuring device when measuring, causing waste of time and energy. Moreover, if the volume of the box is too large and the weight of the box is too heavy, measuring the three dimensions of the shipping box would be much more inconvenient.

SUMMARY OF THE INVENTION

Aiming at solving the above-mentioned problem, the present invention provides a 3D laser measuring device, which may measure three dimensions of a shipping box and can be easily operated.

A 3D laser measuring device to be placed onto every individual shipping box in accordance with the present invention, comprising:

a measurement body;

an X-axial laser beam outlet and an X-axial reception lens arranged on a side wall of the measurement body, and a Y-axial laser beam outlet and a Y-axial reception lens arranged on another side wall of the measurement body;

a Z-axial laser beam outlet and a Z-axial reception lens arranged on the bottom of the measurement body, and a groove formed in the bottom and being open at the side wall with the X-axial laser beam outlet and open at the side wall with the Y-axial laser beam outlet;

a control device placed inside the measurement body and configured to control the emitting of the laser beams from the laser beam outlets when receiving a measurement instruction through a measurement button on the measurement body.

Optionally, the groove has a corner with a 90 degree angle structure.

Optionally, a sensor is arranged on a side wall of the groove. If the sensor touches upon the measured box, the control device instructs to emit the three laser beams including the X-axial laser beam, the Y-axial laser beam and the Z-axial laser beam.

Optionally, the device also comprises two laser reflecting corner plates, and each laser reflecting corner plate includes a reflection plate and a mounting bracket, wherein the reflection plate is fixed to one end of the mounting bracket, and the other end of the mounting bracket is used to place on the measured box. The reflection plate extends a certain distance along the length direction of the mounting bracket. The laser beams emitted from the laser beam outlets project to the reflection plates and reflect back to the respective reception lens by the action of the respective reflection plates.

Optionally, the mounting bracket is provided with an angle iron shape.

Optionally, the measurement body includes a magnet component, and the laser reflecting corner plates can be attached to the measurement body if not used.

Optionally, the reflection plate may be an aluminum alloy plate, and the mounting bracket may be a stainless steel plate, wherein the thickness of the stainless steel plate may be thicker than the thickness of the aluminum alloy plate.

Optionally, a plurality of buttons may be arranged on the top of the measurement body, and the plurality of buttons may be connected to the control device.

Optionally, a wireless communication module is configured inside the measurement body and used for wirelessly connecting to a label printer or a computer and transmitting the measurement data obtained by measuring to the label printer or the computer.

Optionally, the control device is further a control device configured to calculate the length, width and height of the measured box based on the round trip time of the laser beams and further calculate the volume and/or the weight of the measured box.

Optionally, a display screen is arranged on the top of the measurement body and used for displaying the length, width, height, volume or weight of the measured box, and the display screen is connected to the control device.

The 3D laser volume measurer of the present invention takes only the click of one measurement button to measure the three dimensions of the box simultaneously, and it is easy and efficient. When using the laser reflecting corner plates, the three dimensions of the box can be measured at any position, without the need of placing the box against a wall corner. When measuring the three dimensions of a shipping box, there is no need to move the shipping box and just placing the 3D laser measurer onto the shipping box may obtain the three dimensions of the box. Compared to the existing measuring devices, it is easy and convenient, and furthermore is time-saving and energy-saving.

DETAILED DESCRIPTION OF PREFERRED EMBODIMENTS

The embodiments of the present invention will be detailed in the following in conjunction with the accompanying drawings.

Figure 1:
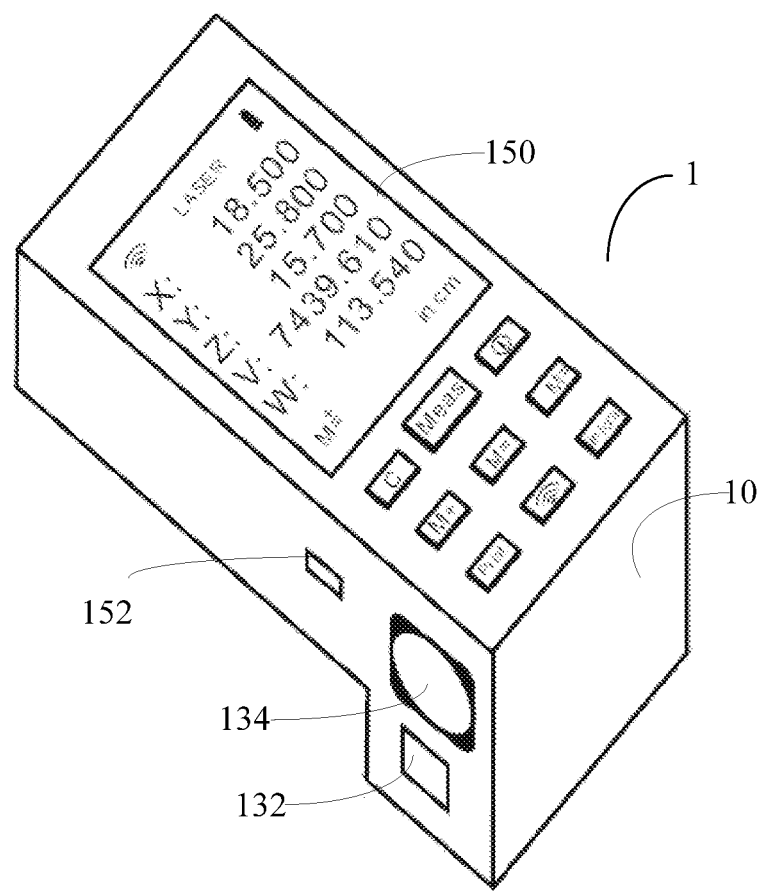
FIG. 1 is a perspective view of a 3D laser measurer according to the embodiments of the present invention.
Figure 2:
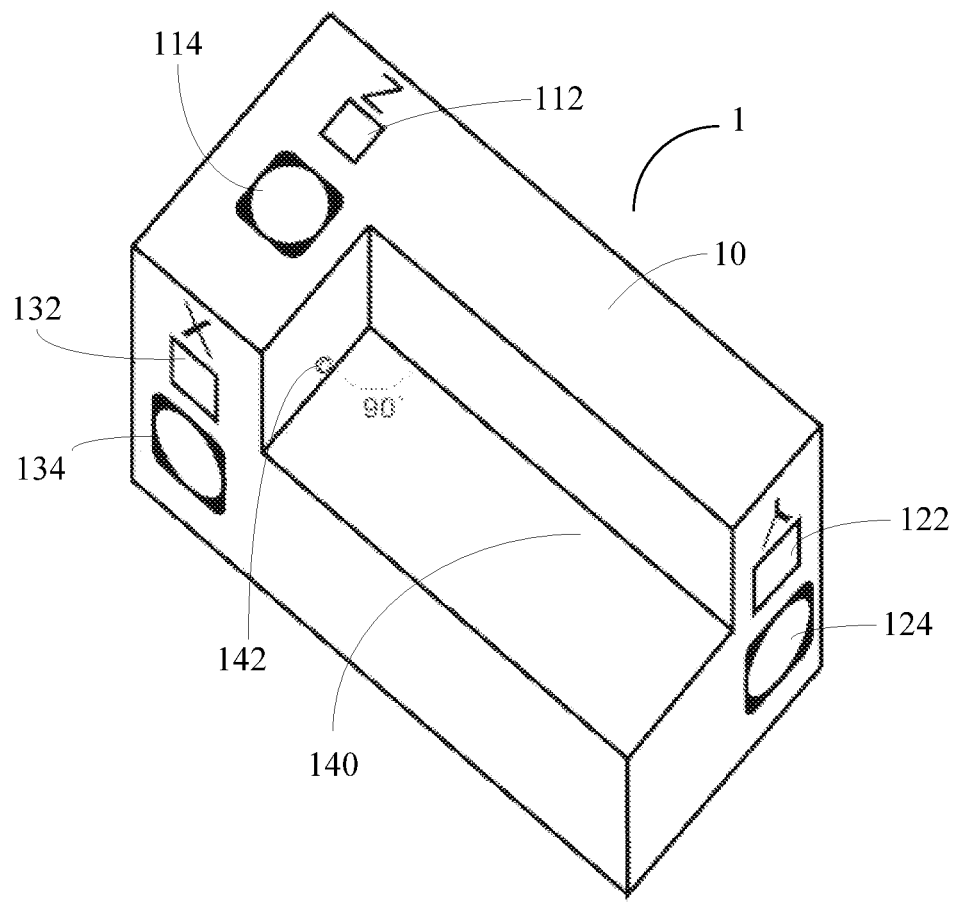
FIG. 2 is a perspective view of the 3D laser measurer of FIG. 1 observed from a different point of view.

FIG. 1 illustrates a perspective view of a 3D laser measurer according to the embodiments of the present invention. FIG. 2 is a perspective view of the 3D laser measurer of FIG. 1 observed from a different point of view. Referring to FIG. 1 and FIG. 2, the 3D laser measurer 1 includes a measurement body 10. A Z-axial laser beam outlet 112 and a Z-axial reception lens 114, which are used for measuring the height, are arranged on the bottom of the measurement body 10. A Y-axial laser beam outlet 122 and a Y-axial reception lens 124, which are used for measuring the width, are arranged on one side wall of the measurement body 10, and the X-axial laser beam outlet 132 and an X-axial reception lens 134, which are used for measuring the length, are arranged on the other side wall of the measurement body 10. A groove (or rectangular indent) 140 is formed in the bottom of the measurement body 10 and the groove 140 is open at the side wall with the X-axial laser beam outlet and is open at the side wall with the Y-axial laser beam outlet.

The corners of the groove 140 are preferably formed with a 90 degree angle structure, and thus the measurer 1 can be easily fixed onto the corner of the box without having to precisely align the groove of the measurement body to the corner of the box.

A safety sensor 142 is arranged on one side wall of the groove 140. When the measurer 1 is placed onto the measured shipping box to proceed measuring, the all three laser beams will work if the sensor 142 is touched upon the box; otherwise the device 1 will become a range measurer that activates only the Y-axial laser beam if the sensor 142 is not touched upon the box.

There are many buttons and a display screen 150 arranged at the top part of the measurement body 10. The display screen 150 can display the length, width, height, volume and weight of the measured box. In one embodiment, the buttons may include a power on/off button "⊙", a measurement button "Meas", a clear button "C", a memory subtraction button "M−", a memory add button "M+", a memory retrieve button "M=", a change unit of measurement button "in/cm", a wireless connect button and a print button "Print". The measurement body 10 is also configured to have a data cable port 152. A control device (not shown) is placed inside the measurement body 10, and the buttons are connected with the control device. The laser measurer 1 further includes a wireless communication module, such as a Bluetooth module or a WiFi module.

The control device implements the corresponding control operations according to the control instructions transmitted by the buttons. For example, under the click of the wireless connect button, the control device will control the Bluetooth module in connection with a label printer. Under the double click of the print button "Print", the control device will transmit the measurement data (e.g. those displayed on the display screen 150) to the label printer to be printed. As another example, the 3D laser measurer is connected to a computer via the WiFi module, and the control device transmits the measurement data to the computer via the WiFi module.

Figure 3:
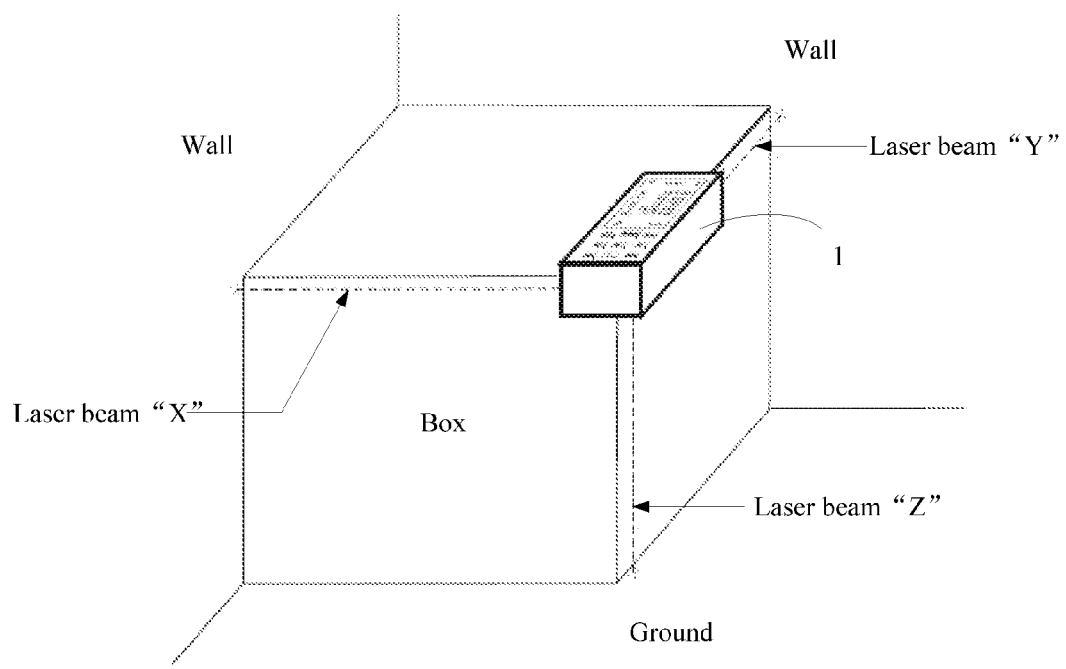
FIG. 3 is a schematic diagram of measuring a shipping box by using the 3D laser measurer.

FIG. 3 illustrates a schematic diagram of measuring a shipping box by using the 3D laser measurer. As shown in FIG. 3, when measuring the shipping box, the shipping box must be placed against a wall corner that is at a 90 degree angle and the laser measurer is placed onto the corner of the shipping box that is far away from the wall corner, the laser beams emitted from the X, Y, and Z axial laser beam outlets will be projected respectively along the length, width and height directions of the shipping box, and be reflected back to the measurer upon encountering the walls or the ground, and then be received by the X, Y and Z axial reception lenses. The control device can measure the length, width and height of the shipping box based on the round trip time of the transmission of the laser beams.

The control device can further calculate the volume and/or weight of the shipping box based on the measured length, width and height of the shipping box, wherein the weight of the shipping box can be calculated based on the shipping company's formula.

Figure 4A:
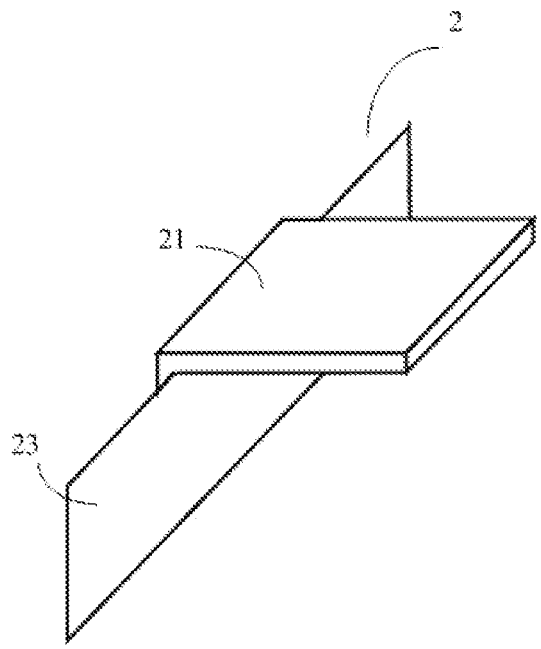
FIGS. 4a-4b are schematic structure diagrams of the laser reflecting corner plates according to the embodiments of the present invention.
Figure 4B:
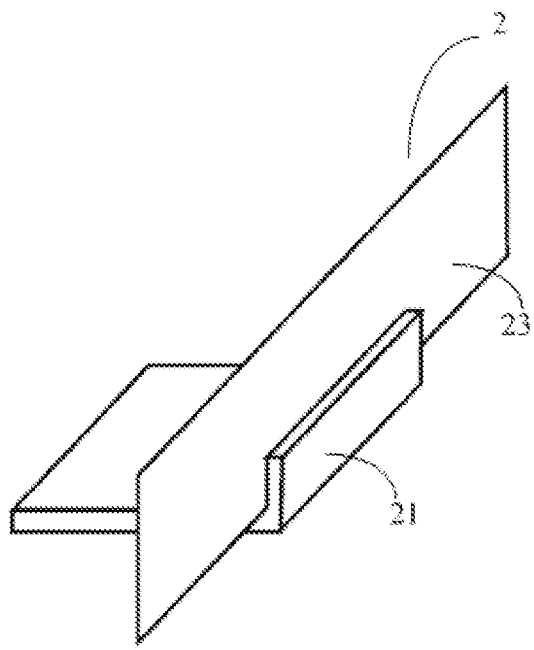

FIG. 4a and FIG. 4b illustrate schematic structure diagrams of the laser reflecting corner plates according to the embodiments of the present invention. As shown in FIG. 4a and FIG. 4b, the laser reflecting corner plate 2 includes a mounting bracket 21 and a reflection plate 23. The reflection plate 23 is fixed onto one end of the mounting bracket 21, and the other end of the mounting bracket 21 is used to be fixed onto the shipping box. In one embodiment, the mounting bracket 21 is provided with an angle iron shape.

The mounting bracket 21 and the reflection plate 23 may be made of different materials. For example, the reflect plate 23 may be an aluminum alloy plate, and the mounting bracket 21 may be a stainless steel plate. Furthermore, the stainless steel plate has a thickness thicker than the aluminum alloy plate. In this way, when the reflecting corner plate is placed on the corner of the box, the mounting bracket is heavier than the reflect plate, thereby preventing backfall.

Figure 5:
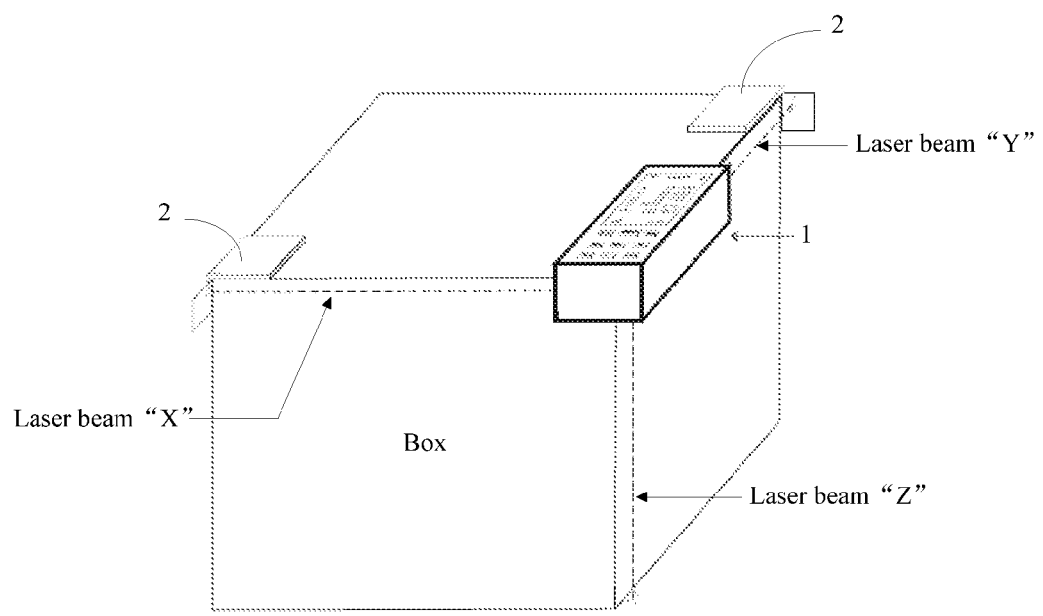
FIG. 5 is a schematic diagram of measuring the shipping box by using the 3D laser measurer in combination with the laser beam reflecting corner plates.

When being used, the two laser reflecting corner plates are fixed on the opposite angles of the shipping box respectively. As shown in FIG. 5, each of the reflection plates extends a certain distance from the box body. The laser beams are projected to the reflection plates and then are returned back to the measurer 1 to be received by the reception lenses. Optionally, the measurement body 10 of the laser measurer 1 includes a magnet component for attaching the laser reflecting corner plates 2 to the measurement body 10 if not used.

The 3D laser measurer of the invention is able to measure the three dimensions of the box simultaneously under the click of the measure button, and it is easy and efficient.

While the embodiments of the present invention have been explained and described, various changes, modifications, alternatives and variants can be made to the embodiments by those skilled in the art without departing from the principle and spirit of the present invention. The scope of the present invention is only defined by the claims as attached and the equivalents thereof.

What is claimed is:

1. A 3D laser measuring device, comprising:
a measurement body;
an X-axial laser beam outlet and an X-axial reception lens arranged on a side wall of the measurement body, and a Y-axial laser beam outlet and a Y-axial reception lens arranged on another side wall;
a Z-axial laser beam outlet and a Z-axial reception lens arranged on the bottom of the measurement body, and a groove formed in the bottom and being open at the side wall with the X-axial laser beam outlet and at the side wall with the Y-axial laser beam outlet, is;
a control device placed inside the measurement body and configured to control the emitting of the laser beams from the laser beam outlets when receiving a measurement instruction through a measurement button on the measurement body.

2. The 3D laser measuring device according to claim 1, wherein the groove has a corner with a 90 degree angle structure.

3. The 3D laser measuring device according to claim 1, wherein a sensor is arranged on a side wall of the groove, and
if the sensor touches upon the measured box, the control device instructs to emit the three laser beams including the X-axial laser beam, the Y-axial laser beam and the Z-axial laser beam.

4. The 3D laser measuring device according to claim 1, wherein the device further includes two laser reflecting corner plates;
wherein the laser reflecting corner plate includes a reflection plate and a mounting bracket, and the reflect plate is fixed on one end of the mounting bracket, and the other end of the mounting bracket is used to be placed onto the measured box;

wherein the reflection plate extends a certain distance along the length direction of the mounting bracket; and wherein the laser beams emitted from the laser beam outlets are projected to the reflection plates and reflected back to the respective reception lenses.

5. The 3D laser measuring device according to claim 4, wherein the mounting bracket is provided with an angle iron shape; and/or, wherein the measurement body includes a magnet component capable of attaching the laser reflecting corner plates to the measurement body if not used.

6. The 3D laser measuring device according to claim 4, wherein the reflection plate is an aluminum alloy plate, and the mounting bracket is a stainless steel plate, and the thickness of the stainless steel plate is thicker than the thickness of the aluminum alloy plate.

7. The 3D laser measuring device according to claim 1, wherein there are a plurality of buttons arranged on the top of the measurement body, and the plurality of buttons are connected to the control device.

8. The 3D laser measuring device according to claim 1, wherein the measurement body is configured to have a wireless communication module used for wirelessly connecting with a label printer or a computer and transmitting the measurement data obtained by the measuring to the label printer or the computer.

9. The 3D laser measuring device according to claim 1, wherein the control device is further a control device configured to calculate the length, width and height of the measured box based on the round trip time of the laser beams and further calculate the volume and/or the weight of the box.

10. The 3D laser measuring device according to claim 9, wherein a display screen is arranged on the top of the measurement body, and the display screen is configured to display the length, width, height, volume or weight of the measured box, and wherein the display screen is connected to the control device.

* * * * *